United States Patent Office 3,097,970
Patented July 16, 1963

3,097,970
METHOD OF CLARIFYING CANE SUGAR JUICE
Juan Delfin, Alvarado, Veracruz, Mexico, assignor to Dow Corning Corporation, Midland, Mich., a corporation of Michigan
No Drawing. Filed Dec. 8, 1960, Ser. No. 74,459
5 Claims. (Cl. 127—48)

This invention relates to an improved method of clarifying cane sugar juice during processing.

During the manufacture of white, crystalline sugar from sugar cane an aqueous solution of cane sugar juice containing suspended and dissolved impurities is processed. One of the process steps is clarification of the cane juice-water solution. The clarification is carried forward to remove foreign materials in suspension in the solution. The process is a purification process but the physical effect of removing the impurities is to produce a clarified solution. A clear solution indicates an effective purification.

The clarification process is carried forward in three steps. The pH of the cane juice solution is adjusted from acidic to neutral or basic by adding alkaline substances such as milk of lime. The pH is adjusted to neutralize free acids present and to form insoluble compounds with gums, resins, wax, phosphates, silicates, phenols, iron and aluminum salts present.

Following adjustment of pH, the cane juice solution is heated to hasten formation of precipitates and coagulation of albumin contained in the juice. The precipitates tend to absorb colloidal particles in the cane juice solution and also tend to combine with each other thus forming flocs of variable consistency, density and size. The formation of flocs is directly affected by the amount of air occluded in the cane juice solution. The amount of air occluded is directly proportional to the Brix of the solution (i.e. as the sugar solids content of the solution increases, the amount of occluded air therein increases). The occluded air adheres to the floc formed thus reducing the density of the floc. Some of the floc becomes lighter than the solution and floats and foams on the surface. Some of the floc becomes equivalent in density to the cane juice solution and remains suspended in the juice as a difficultly removable impurity easily noted by the permanent turbidity of the solution. The bulk of the floc remains more dense than the said solution and tends to settle out. However, the precipitated floc remains less dense, more bulky in volume, more easily redispersed through the solution and contains a larger amount of entrapped sugar solution than would be found if the occluded air were eliminated.

The final step of clarification is sedimentation. The velocity of sedimentation is directly related to the density of the floc and inversely related to the viscosity of the cane juice solution. The sediments are separated from the juice solution and pressed or filtered and washed to remove cane juice entrapped therein.

Economical clarification of cane sugar juice solutions should be characterized by rapid and complete precipitation of all non-sugar solids in the solution. The precipitate should form a compact, relatively non-dispersible mass, relatively free of sugar solution at the bottom of the settling tanks. It is the primary object of this invention to introduce such an economical and practical clarification method.

This invention consists of introducing a silicone to raw cane sugar juice solution during the clarification of the said solution.

The silicones employed herein are based on fluid organosiloxane polymers of the unit formula

where each R is a monovalent hydrocarbon radical, preferably alkyl or aryl, and $n$ has an average value of 1.99 to 2.01. These polymers are linear, essentially diorgano siloxanes. The organic substituents are monovalent hydrocarbon radicals including alkyl radicals such as methyl, ethyl, propyl and octadecyl; aryl radicals such as phenyl, diphenyl and anthracyl; alkaryl radicals such as tolyl, xylyl and methylnaphthyl; aralkyl radicals such as benzyl and phenylethyl; cycloaliphatic radicals such as cyclopropyl and cyclopentyl; and alkenyl radicals such as vinyl, allyl and octadecenyl. The operative polymers can contain limited proportions of $RSiO_{3/2}$, $R_3SiO_{1/2}$ and $SiO_{4/2}$ units (e.g. less than about 1 mol percent of these groups). These polymers vary from thin fluids to extremely viscous and even gum-like fluids soluble in organic solvents such as benzene. The preferred polymers are dialkylsiloxanes and preferably dimethylsiloxane polymers.

The siloxane polymer is best employed in the form of an aqueous system such as a water solution, a water dispersion or a water emulsion. Particularly useful are oil-in-water type emulsions of dimethylsiloxane fluids with finely divided silicas such as silica aerogels, silica xerogels, fume silicas, and other known silicas as well as carbon blacks. These emulsions generally employ emulsifying agents such as methyl cellulose, glyceryl-monostearate, polyoxyethylene stearate, propylene glycol monolaurate, trimethylnonyl ether of polyethylene glycol and so forth.

The silicone should be added to the aqueous cane sugar juice solution before any other chemicals are added during the clarification process. While some improvement in clarification can be noted when the silicone is added at any time during the process, the best results are achieved by adding the silicone at the beginning of the process.

The silicone is added in small proportions and improvement is noted with as little as 0.5 part siloxane polymer per million parts cane juice solution. There is no upper limit on the amount of silicone to be added but practical consideration of cost, contamination, etc. suggest 100 parts siloxane per million parts cane juice solution as a practical maximum.

The following laboratory experiment is offered as an example of the efficiency of this method.

EXAMPLE 1

A sample of aqueous cane sugar juice solution having a pH of 5.7 was adjusted to a Brix of 16.5. The sample was divided into six samples labeled (*a*) through (*f*). Sample (*a*) was retained as a control and a silicone emulsion consisting of 9.5 parts dimethylsiloxane fluid of about 350 cs. at 25° C., 0.5 part silica aerogel and 7 parts emulsifying agent consisting of polyoxyethylene glycol monostearate, glycerol monostearate and methylcellulose in 83 parts water was added in varying amounts as follows: Sample (b) 5 parts silicone per million (p.p.m.) parts solution; sample (c) 7.5 p.p.m.; sample (d) 10 p.p.m.; sample (e) 12.5 p.p.m.; and sample (f) 15 p.p.m. The pH of each sample was adjusted to 6.8 by adding thereto milk of lime of 5° Bé. The volumes of the samples were controlled so that each sample contained the same amount of cane sugar juice solution as every other sample. The samples were heated to 103° C. in an autoclave, then agitated and heated on a water bath at 80° C. Settling velocities were observed by measuring the time required for 5 cms. of sediment to settle out. The nature of the floc formed was observed and the volume of sediment obtained was measured. The results are summarized in Table I below.

| Sample | Velocity of Sedimentation, cm./minute | Contraction of sediment, percent |
|---|---|---|
| (a) | 1 | 0 |
| (b) | 1.25 | 10.5 |
| (e) | 1.66 | 20.5 |
| (d) | 2.89 | 31 |
| (c) | 3.75 | 41.25 |
| (f) | 6.43 | 51.7 |

As the concentration of silicone increased from (a) through (f), the floc changed regularly from light, easily dispersed, irregularly shaped particles to relatively dense, spherically shaped particles resistant to dispersion. The velocity of sedimentation (i.e. rate of sediment formation) also increased regularly with increased proportion of silicone. Using the amount of sediment formed in the sample (a) (the blank or control), as a standard, the volume of sediment and consequently the amount of entrapped cane juice solution decreased regularly with increasing proportions of silicone until at 15 parts silicone per million parts cane juice solution the volume of sediment had been reduced by 50%. In each sample the degree of clarity achieved was equivalent to that achieved in every other sample.

The addition of the silicone to the cane sugar juice solution during the clarification process results in: (1) a clearer and purer juice solution for further processing; (2) a denser floccule with an increased settling rate; (3) more uniform and larger floccule particles; (4) a smaller volume of sediment containing a smaller amount of entrapped cane juice; and (5) decrease in foaming heretofore resulting from floc floating on the cane juice solution surface.

Although this invention has been fully described with regard to flocculation and clarification in cane sugar processing, it has potential application in many arts and industries where agglomeration of fine particles is involved. Thus in processing many food stuffs as well as ores and even fine chemicals this process may be useful.

That which is claimed is:

1. In the clarification of aqueous cane sugar juice solutions the improvement consisting of adding to said solution at least 0.5 part by weight fluid organosiloxane polymer per million parts by weight of solution.

2. The process of claim 1 further characterized in that the fluid organosiloxane polymer is added as an aqueous emulsion.

3. The process of claim 2 further characterized in that the fluid organosiloxane polymer is a benzene soluble dimethylsiloxane polymer.

4. The process of claim 3 further characterized in that the fluid organosiloxane polymer is admixed with silica.

5. The process of claim 4 further characterized in that the fluid organosiloxane polymer is added prior to the addition of any other chemicals during the clarification.

References Cited in the file of this patent

UNITED STATES PATENTS

| 2,216,754 | Sanchez et al. | Oct. 8, 1940 |
| 2,539,397 | Bottoms et al. | Jan. 30, 1951 |

OTHER REFERENCES

Chem. Abstracts I, vol. 48, p. 13571f, 1954.
Chem. Abstracts II, vol. 52, p. 8918i, 1958.